United States Patent
Gerasimov et al.

(10) Patent No.: US 11,015,615 B2
(45) Date of Patent: May 25, 2021

(54) REACTOR COOLANT PUMP SET

(71) Applicants: JOINT STOCK COMPANY "CENTRAL DESIGN BUREAU OF MACHINE BUILDING", St. Petersburg (RU); JOINT STOCK COMPANY "SCIENCE AND INNOVATIONS" ("SCIENCE AND INNOVATIONS", JSC), Moscow (RU)

(72) Inventors: Vladimir Sergeevich Gerasimov, St. Petersburg (RU); Andrey Vladimirovich Goronkov, St. Petersburg (RU); Aleksandr Sergeevich Vasil'ev, St. Petersburg (RU); Rodion Petrovich Kazantsev, St. Petersburg (RU); Sergey Yur'evich Shchutskiy, St. Petersburg (RU)

(73) Assignees: Joint Stock Company "Central Design Bureau of Machine Building", St. Petersburg (RU); Joint Stock Company "Science and Innovations" ("Science and Innovations", JSC), Moscow (RU)

( * ) Notice: Subject to any disclaimer, the term of this patent is extended or adjusted under 35 U.S.C. 154(b) by 109 days.

(21) Appl. No.: 15/741,087

(22) PCT Filed: Jun. 20, 2016

(86) PCT No.: PCT/RU2016/000372
§ 371 (c)(1),
(2) Date: Dec. 29, 2017

(87) PCT Pub. No.: WO2017/123113
PCT Pub. Date: Jul. 20, 2017

(65) Prior Publication Data
US 2018/0298907 A1 Oct. 18, 2018

(30) Foreign Application Priority Data

Jan. 11, 2016 (RU) .............................. 2016 1 00508

(51) Int. Cl.
*F04D 29/58* (2006.01)
*F04D 29/047* (2006.01)
(Continued)

(52) U.S. Cl.
CPC ....... *F04D 29/5806* (2013.01); *F04D 13/021* (2013.01); *F04D 13/06* (2013.01); *F04D 29/047* (2013.01); *F04D 29/586* (2013.01)

(58) Field of Classification Search
CPC ........ F04D 13/021; F04D 13/06; F04D 29/58; F04D 29/586; F04D 29/5806; F04D 13/12; F04C 11/005; F04C 29/046–049
See application file for complete search history.

(56) References Cited

U.S. PATENT DOCUMENTS 6,208,512 B1 * 3/2001 Goldowsky ............... F04D 3/02
                                              165/104.33
6,305,915 B1 * 10/2001 Paddock ............... F04D 29/047
                                              417/366
(Continued)

*Primary Examiner* — Bryan M Lettman
(74) *Attorney, Agent, or Firm* — Brandon V. Zuniga; James R. Gourley; Carstens & Cahoon, LLP

(57) ABSTRACT

Non-Volume displacement pumps used at nuclear power plants (NPP) in reactor coolant pump sets for the primary coolant circuit of the nuclear power system. The reactor coolant pump set comprising a vertical vane-type single-stage pump with bottom arrangement of the impeller, the pump shaft is connected to the electric motor shaft by a rigid coupling, the radial-axial bearing, installed in the electric motor upper chamber, is made of two main elements: a radial bearing made in the form of a rotor metallic bushing installed on the cylindrical part of the collar and an axial bearing consisting of two stator lever-type balance arm systems with cover plates of antifriction material and rotor (Continued)

cover plates of antifriction material. The radial-axial bearing is cooled by water from the NPP system, pressure head whereof is increased by the screw-type pump located on the upper butt of the radial-axial bearing collar.

1 Claim, 2 Drawing Sheets

(51) Int. Cl.
*F04D 13/02* (2006.01)
*F04D 13/06* (2006.01)

(56) References Cited

U.S. PATENT DOCUMENTS

| | | | |
|---|---|---|---|
| 2007/0041846 A1* | 2/2007 | Bosen | F01D 15/005 417/228 |
| 2010/0129237 A1* | 5/2010 | Eide | F04D 13/064 417/410.1 |
| 2012/0107105 A1* | 5/2012 | Korenblik | F04D 17/122 415/180 |
| 2012/0107143 A1* | 5/2012 | Gilarranz | F04D 25/0606 417/53 |
| 2013/0058804 A1* | 3/2013 | Ring | F01D 5/085 417/369 |
| 2013/0136629 A1* | 5/2013 | Maier | F04D 17/122 417/366 |
| 2013/0294939 A1* | 11/2013 | Gilarranz | F04D 17/12 417/53 |

\* cited by examiner

REACTOR COOLANT PUMP SET

CROSS-REFERENCE TO RELATED APPLICATIONS

This application is a US 371 Application from PCT/RU2016/000372 filed Jun. 20, 2016, which claims priority to Russia Application 2016100508 filed Jan. 11, 2016, the technical disclosures of which are hereby incorporated herein by reference.

TECHNICAL FIELD

The proposed technical solution relates to non-volume displacement pumps for liquids with rotating motion of working elements and can be chiefly used at nuclear power plants (NPP) in reactor coolant pump sets (RCPS) intended for the coolant circuit of the nuclear power system (NPS), flowing through the reactor core.

BACKGROUND OF THE INVENTION

The main reliability component of RCPS is as follows: service life of RCPS bearing friction pairs, its repairability during operation at NPP, allowing for inspection, repair and replacement of individual assemblies and parts with the minimum possible labor input and time. Wherein RCPS repairability is to a great extent determined by the good repairability of the radial-axial bearing in the pump body. It is advisable to reduce the time of maintenance personnel's stay near the normal location of the repaired unit at the NPP, as well as to reduce the necessary deactivation scope during installation and removal operations.

INVENTION DISCLOSURE

Pump unit RCPS-1391 is known, used at NPP units with VVER-1000 and VVER-1200 reactors. RCPS-1391 is a vertical water pump unit with a mechanical shaft seal. The pump unit consists of two independent parts—pump body and electric motor. The pump body shaft is connected to the electric motor shaft by means of a flexible plate coupling, transmitting the electric motor shaft torque to the pump body shaft. The pump body shaft rotates in two independent bearings. The electric motor shaft rotates in two independent radial bearings and a thrust bearing receiving the electric motor rotor weight. The lower radial bearing of the pump body is lubricated and cooled by water working medium. The radial-axial bearing of the pump body is located between the lower radial bearing and the flexible coupling. The radial-axial bearing of the pump body is cooled by water and consists of: a radial bearing consisting of a metallic rotor bushing and a stator bushing made of antifriction material and an axial bearing with antifriction cover plates made of silicified graphite.

The axial bearing receives the resultant axial force composed of: the upward expulsive force caused by the working medium pressure in the hydraulic body, the hydrodynamic force on the impeller and weight of the pump body rotor. The upward expulsive force significantly exceeds the downward hydrodynamic force on the impeller and weight of the pump body shaft rotor. Since the bearing axial loads significantly exceed the radial loads, the RCPS axial antifriction cover plates are repaired and inspected at least twice more often than the antifriction bushings of radial bearings. Inspection and repair of the radial-axial bearing requires the following: disconnection of the coupling, removal of the electric motor, removal of the radial-axial bearing body together with the elements of the radial-axial bearing with subsequent transportation to the repair zone.

Thus, the shortcomings of this RCPS design are as follows:
the expulsive force, acting on the axial bearing, which acts on the pump rotor, is insufficiently compensated by other forces;
the need for electric motor removal for inspection and replacement of the most wearing bearing elements, in particular, the antifriction cover plates of the radial-axial bearing.

NPP pump units with rigid connection of shafts are also known [F. M. Mitenkov, E. G. Novinsky, V. M. Budov. NPP Main Circulation Pumps. —2-nd ed. Revised and enlarged. —M.: Energoatomizdat, 1990, p. 32-34 (FIG. 2.5)).

In this layout, the pump and electric motor shafts are interconnected by a rigid coupling, and the unit has three radial bearings, two of which are located in the motor and one in the pump. The pump bearing is lubricated by the working medium. According to this layout the reactor coolant pump set for "Loviisa" NPP was developed [ibid. p. 192-194 (FIG. 2.5)]. This reactor coolant pump set uses an oil-lubricated axial bearing.

The shortcoming of this design is the oil system, reducing fire safety of the NPP unit.

The invention object was to reduce the load on the axial bearing during RCPS operation by its installation not in the pump body, but in the electric motor upper chamber, and to transfer the weight of the electric motor rotor and flywheel to this bearing in order to compensate the expulsive axial force and ensure lubrication of electric motor radial bearing with water. An additional object is improving the repairability of RCPS.

When this invention is used, the following technical results are possible, in particular:
first, reduction of axial bearing load;
second, reliability increase;
third, reduced time for axial bearing repair and replacement.

As a solution of the problem, allowing for attaining the effect with the specified characteristics, a reactor coolant pump set is proposed, chiefly for nuclear power plant units with light-water coolant, comprising:
a vertical vane-type single-stage cantilever pump,
an electric motor comprising a radial-axial bearing, installed in the upper chamber and receiving all axial loads acting on the unit rotor, including the load from pressure of NPP primary water, a built-in screw-type pump installed on the upper butt of the collar of the radial-axial bearing, a lower radial bearing installed in the lower chamber,
a flywheel arranged in the electric motor rotor bottom,
an electric motor shaft connected with the pump shaft by a rigid coupling.

The radial-axial bearing installed in the electric motor upper chamber is to be made of two main elements:
a radial bearing made in the form of a rotor metallic bushing installed on the cylindrical part of the collar, installed on the motor shaft by way of cone fitting and fastened by means of bolts and a pressure flange on the shaft's upper butt, and a stator bushing made of antifriction material,
and an axial bearing consisting of two stator thrust rings, containing a lever-type balance arm system with cover plates of antifriction material and rotor cover plates of antifriction material, installed on the flat part of the collar.

Time for axial bearing repair and replacement is reduced due to the fact that the electric motor upper chamber is made in the form of an easily removable leakproof stainless steel tank, providing access to the radial-axial bearing.

Thus, inspection and repair of the radial-axial bearing does not require the removal of the RCPS electric motor.

Pressure head of the water for bearing lubrication, flowing to the upper chamber, is increased by the screw-type pump consisting of bushings with screw thread, installed on the collar top, the water is pumped through the radial-axial bearing and then comes via the bleeding pipe to the radial bearing installed in the electric motor lower chamber.

BRIEF DESCRIPTION OF THE DRAWINGS

The proposed device (in a particular version) is explained by drawings.

DETAILED DESCRIPTION OF THE PREFERRED EMBODIMENTS

Figure 1:
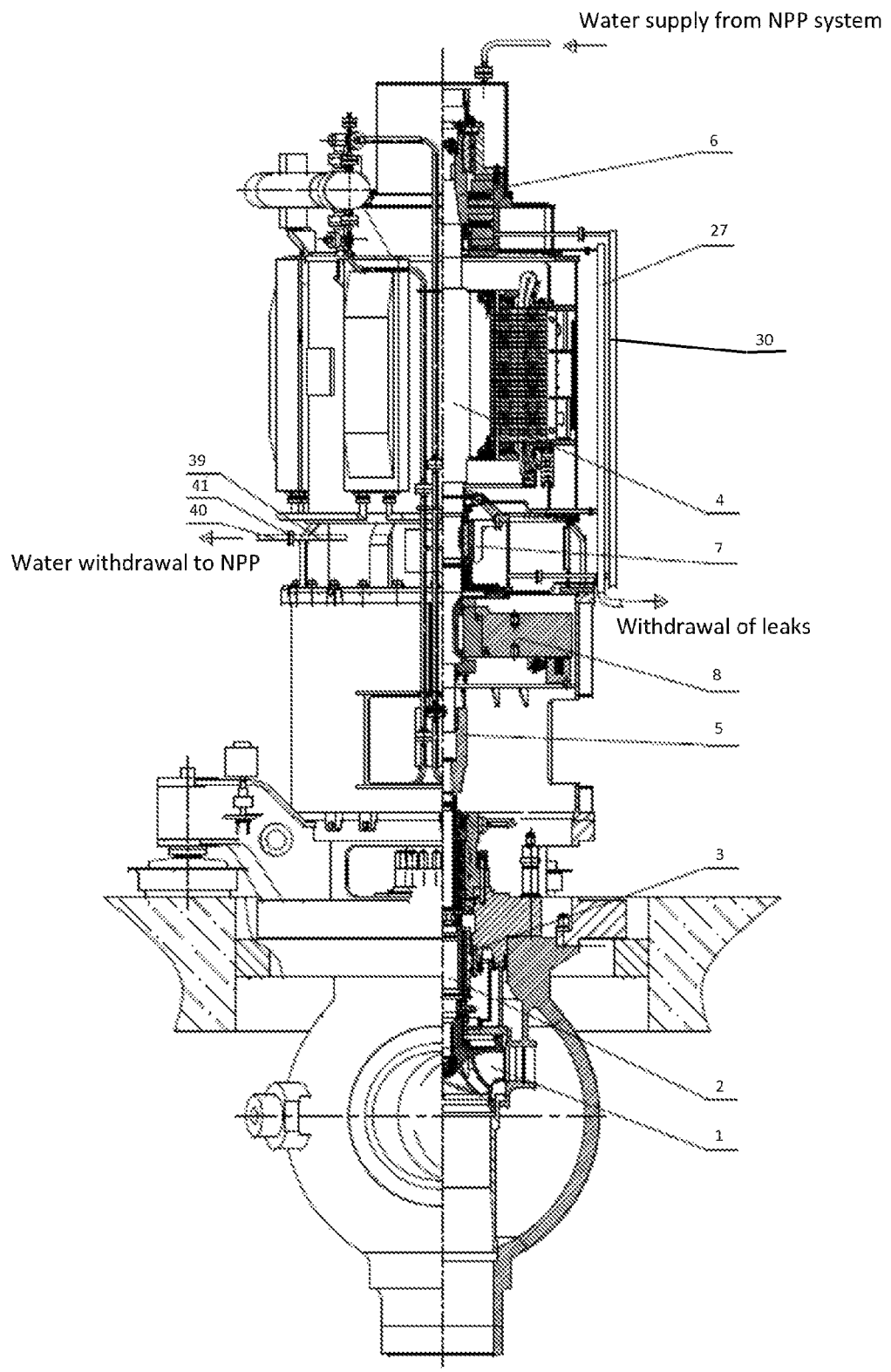
FIG. 1—RCPS overall view
FIG. 2—Upper chamber of electric motor
FIG. 3—Lower chamber of electric motor

The vertical vane-type single-stage cantilever pump, (FIG. 1) with bottom arrangement of impeller 1, wherein pump body shaft 2 with lower radial bearing 3 cooled by the working medium is connected to electric motor shaft 4 by means of coupling 5, transmitting the torque and resultant axial force between the shafts. Radial-axial bearing 6, receiving all axial loads acting on the unit rotor, is installed in the electric motor upper chamber. Electric motor radial bearing 7 is installed in the electric motor lower chamber. Flywheel 8 is installed under the lower radial bearing of the electric motor.

Figure 2:
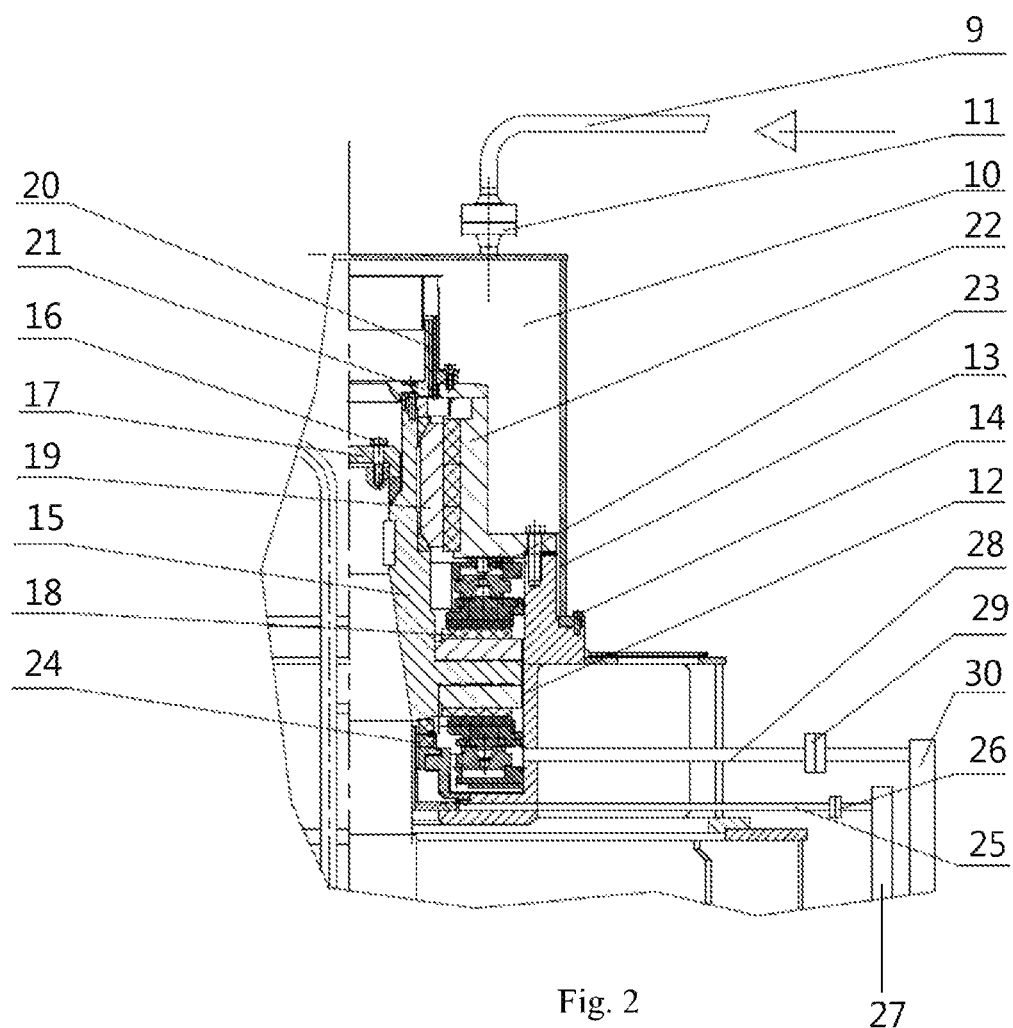

Lubricating water in the reactor coolant pump set is supplied from the remote cooler of the NPP system via pipeline 9 to electric motor upper chamber 10. Pipeline 9 is connected with the upper chamber by flange connector 11. Upper chamber 10 is a leakproof structure made of stainless steel in cylinder shape. Chamber 10 consists of housing 12 (FIG. 2), whereon by means of bolted joints the stator elements of the radial-axial bearing and tank 13 in the form of a cylinder, closed in the top and with a flange connector in the bottom, are installed. The tank is removable and fastened on housing 12 by means of bolts 14.

Collar 15 of the radial-axial bearing is installed on the motor shaft by way of cone fitting. Collar 15 is fastened by means of bolts 16 and pressure flange 17 to the shaft's upper butt. Antifriction backup cover plates 18 are installed on the flat part of bearing collar 15. Metallic bushing 19 of the upper radial bearing is installed on the cylindrical part of collar 15. Metallic bushing 20 with screw thread is installed on the collar top. Together with mating screw bushing 21, fixed on the stator part of the radial-axial bearing, it forms a screw-type pump for cooling liquid circulation during pump unit operation. Radial bearing housing 22 is installed on housing 12 by means of a bolted joint. Upper stator thrust ring 23, consisting of lever-type balance arm system and cover plates made of antifriction material is installed between radial bearing housing 22 and collar 15. The lower thrust ring of similar design is installed between collar 15 and the bottom of housing 12.

Face seal 24 is installed in the bottom of the upper chamber to prevent water ingress in the motor stator cavity. Seal leak comes to bleeding pipeline 25, connected via flanged joint 26 with leak collector 27 (FIG. 1).

In the lower part of housing 12 bleeding pipe 28 is welded, which by means of flanged joint 29 is connected to adapter pipeline 30, being a pipe fixed on the external motor wall.

Figure 3:
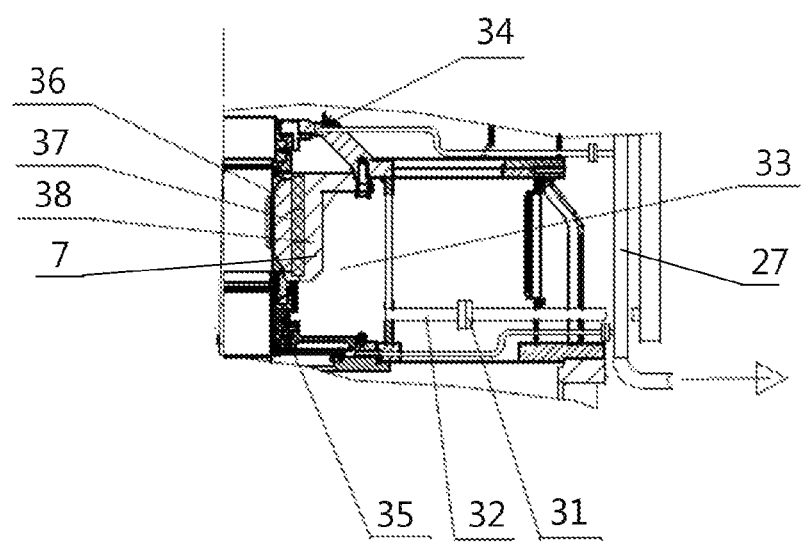

Pressure head of the water for bearing lubrication, flowing to the upper chamber, is increased by the screw-type pump formed by the bushings with screw thread, and the water is pumped through the radial-axial bearing and then comes via the bleeding pipe to the adapter pipeline. The adapter pipeline by means of flanged joint 31 is connected with intake pipe 32 (FIG. 3) welded into the housing of lower chamber 33. The housing of the lower chamber is a leakproof cylindrical structure made of stainless steel, wherein motor radial bearing 7 is installed. Above the housing is upper face seal 34 to prevent leakage into the stator cavity. Face seal 35 is installed on the housing lower butt to prevent leakage into the cavity under the motor. The motor lower radial bearing is steel bushing 36 fastened on the motor shaft and stator bushing made of antifriction material 37, fastened on bearing housing 38, which in its turn is fastened by means of a bolted joint on the housing of lower chamber 33. Under the screw-type pump pressure head the water, flowing to the intake pipe of the lower chamber, lubricates the lower radial bearing and is withdrawn from the lower chamber via welded-in bleeding pipe 39 (FIG. 1) to bleeding pipeline 40, connected to the bleeding pipe by means of flanged joint 41. Water flows via the bleeding pipeline to the NPP remote cooler.

To inspect and repair the radial-axial bearing, it is sufficient to unscrew bolts 14 and remove tank 13, unscrew and remove radial bearing housing 22; unscrew bolts 16, remove mounting flange 17, remove collar 15 and stator thrust rings of radial-axial bearing 23.

Thus, reliability in this invention is increased due to installation of the radial-axial bearing lubricated with water not in the pump body, but in the electric motor upper chamber, and due to the rigid coupling transmitting the axial force and torque. This allows using the weight of the motor rotor with the flywheel to compensate the expulsive force and reduce the resultant force, and, consequently, the bearing loads.

The invention claimed is:
1. A reactor coolant pump set, comprising a vertical vane-type single-stage pump with a bottom arrangement of an impeller, a lower radial journal bearing arranged on a pump shaft above the impeller and lubricated by a transferred medium, a pump shaft seal assembly made in the form of a multistage block of face seals, arranged above the lower radial bearing, a flywheel installed under a radial bearing of the electric motor, characterized in that:
  (i) a pump shaft is connected to an electric motor shaft of the electric motor by a rigid coupling;
  (ii) a radial-axial bearing installed in an electric motor upper chamber of the electric motor is made of two main elements:
  a radial bearing made in the form of a rotor metallic bushing installed on a cylindrical part of a collar, installed on the motor shaft by way of cone fitting and fastened by means of bolts and a pressure flange on an upper butt of the electric motor shaft, and an axial bearing consisting of two stator lever-type balance arm systems with cover plates of antifriction material and rotor cover plates of antifriction material, installed on a flat part of the collar;

(iii) the radial-axial bearing is cooled by water from a nuclear power plant system, pressure head whereof is increased by a screw-type pump located on an upper butt of the radial-axial bearing collar, and composed of a stator and a rotor bushing with a screw thread;

(iv) water flows from the electric motor upper chamber via a pipeline, installed on an electric motor wall of the electric motor, to an electric motor lower chamber of the electric motor, the electric motor lower chamber being made in the form of a stainless steel cylinder, and the water that flows from the electric motor upper chamber lubricates the electric motor radial bearing made in the form of a rotor metallic bushing and a stator bushing of antifriction material; and (v) water from the electric motor lower chamber is withdrawn via a bleeding pipeline to the nuclear power plant system.

* * * * *